Figure 1:
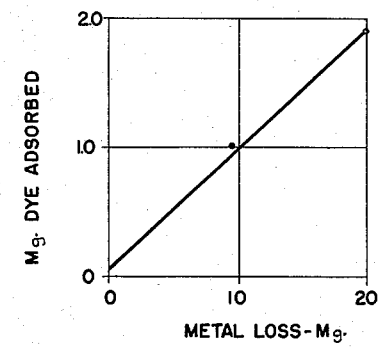

United States Patent Office 2,963,349
Patented Dec. 6, 1960

2,963,349

METHOD OF MEASURING CORROSION RATES

George G. Bernard and Orrin C. Holbrook, Crystal Lake, Ill., assignors to The Pure Oil Company, Chicago, Ill., a corporation of Ohio Filed Dec. 23, 1957, Ser. No. 704,688

10 Claims. (Cl. 23—230)

This invention relates to a method of measuring the corrosion rates of metallic parts or metallic test specimens, in contact with a corrosive atmosphere under any conditions conductive to the attack of the corrosive atmosphere on the metal surfaces, through the use of a chemical indicia to indicate the rate or extent of corrosion with the passage of time. More particularly the invention is based on the discovery that the corroded or corroding metal surface, particularly the surface of ferrous metal parts and test specimens, adsorbs certain nitrogenous dyes selected from the classes of thiazine dyes, basic azo dyes, triphenyl methane dyes or fuchsine dyes, diazo dyes and phenazine dyes, and that the amount of said dye adsorption bears a direct relationship to the amount of corrosion taking place or existent in the metal surface. Since in general dyes and their use is widely known, there is no necessity for explaining the chemistry involved in their application except so far as to enumerate the species of dyes tested for the degree of color adsorption and to show the rate of dye adsorption for two species found to give the desired results. The method of this invention is applicable to the use of such dyes as methylene blue (a thiazine dye). Bismarck brown (a basic azo dye), crystal violet and methyl violet (which are triphenyl methane or fuchsine dyes) and Congo red (a diazo dye). All of the dyes of this invention contain nitrogen, or nitrogen and sulfur, and are used in the form of halide salts or complexes, sodium salts, or complexes, or as mixtures such as Bismarck brown.

In accordance with this invention, it has been found that a normal non-corroded metal surface, particularly a ferrous metal surface adsorbs practically no dye or at most only a small amount of dye. On the other hand, a metal surface, particularly ferrous metal surfaces having a newly formed metal oxide film or coating, adsorbs a large amount of dye. It is this difference in adsorption that forms the basis of this invention.

It becomes then the primary object of this invention to provide a method for determining the extent of corrosion of a metal surface.

Another object of the invention is to provide a method for determining the extent of corrosion of ferrous metal surfaces. A further object is to provide a method of determining the rate of corrosion of a metal surface in contact with a corroding atmosphere.

Still a further object is to provide a method of determining semi-quantitatively the rate of corrosion of a ferrous metal surface in contact with a corrosive atmosphere.

The foregoing objects and other objects of this invention will become apparent or be described as the details of the invention are disclosed herein.

In accordance with this invention, as demonstrated by the following illustrative examples and the drawings in which:

Figure 1 is a graph showing metal loss in milligrams as the abscissas and dye adsorbed in milligrams as the ordinate.

Figure 2:
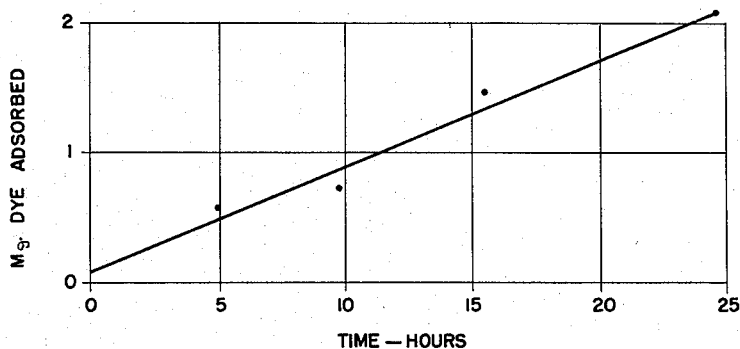
Figure 3:
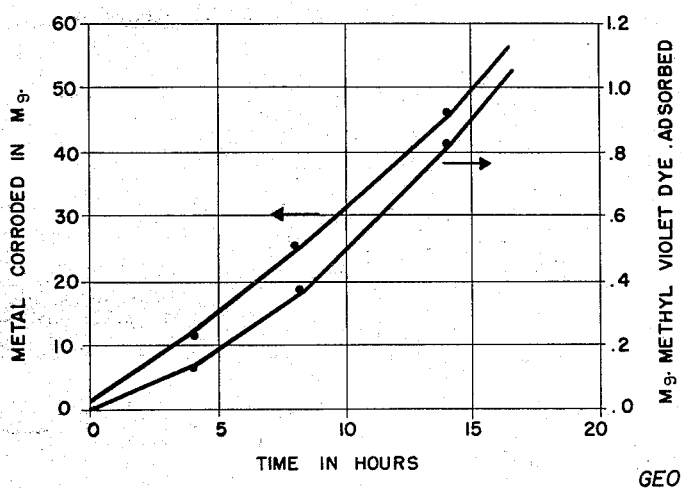

Figure 2 is a graph showing time in hours as the abscissas and milligrams of dye adsorbed as the ordinates, and Figure 3 is a graph showing the correlation between dye adsorption and corrosion having as co-abscissas the metal corroded in milligrams and milligrams of dye adsorbed and as the ordinates the time of contact in hours, it has been found that a substantially linear relationship exists between the rate of corrosion and the amount of dye adsorbed.

Experimental evidence shows that if a dye, such as those previously enumerated, is added to a metal-liquid medium system where no corrosion is occurring, an insignificant or minor portion of dye is adsorbed on the metal, and the dye concentration in the liquid-medium, such as water, remains practically unchanged. However, as soon as the liquid medium is made corrosive, or a promoter is added which causes a non-corrosive liquid medium to become activated and corrosive, the metal oxide which forms is adsorbent and retains substantial quantities of the dye. Accordingly, the concentration of the dye remaining in the liquid medium is an indication of the degree or rate of corrosion. The concentration of the dye can be followed or measured colorimetrically with considerable accuracy and thus the extent and rate of corrosion can be followed and recorded colorimetrically and with the required amount of accuracy for this type of determination.

The invention is best illustrated by reference to the following examples:

*Example I*

A metal test specimen comprising a steel coupon measuring 2 cms. x 2 cms. x 0.1 cm., was immersed in 200 cc. of a corrosive brine solution containing 1% by weight of sodium chloride in a closed glass container, and 4 mg. of methylene blue dye were added. The specimen was mounted so that all of its surface was exposed to the brine and the container was maintained at room temperature. The changes in dye concentration were followed colorimetrically using a Duboscq colorimeter and an average taken of each set of ten readings, as is the accepted practice. It was found that 2.16 mg. of dye was adsorbed in 24 hours. This quantity of dye represents a loss by corrosion of 20 mg. of metal or the equivalent of a corrosion rate of 0.1 i.p.y. The data obtained were plotted in the graphs shown in Figures 1 and 2.

From Figures 1 and 2 it is apparent that a substantially linear relationship exists between the degree of corrosion and the amount of dye adsorbed.

*Example II*

The procedure in Example I was repeated using methyl violet in place of the methylene blue. The results are shown in Figure 3.

Example III

In order to demonstrate that the process of this invention is not limited to fuchsine- or thiazine-type dyes, a series of experiments was conducted in which separate, dilute dye solutions (0.01% by weight) in water were contacted with steel wool in glass containers overnight. Duplicate tests were made on the following dyes: Bismarck brown, crystal violet, Congo red, and Saframine O. In each test it was found that as the steel wool corroded, the color intensity of the dye solutions decreased. Although these experiments were not followed with a colorimeter, it was observed that the color intensity decreases were proportional in all instances by a comparison of the duplicate samples and by a comparison of the color intensities between the different dyes at the end of the test.

The process of this invention has certain necessary and practical limitations. Although from the tests reported herein the relationship between the degree of dye adsorption and the degree of corrosion is substantially linear, it cannot be assumed that any exact quantitative relationship exists between these two factors. Each corrosion system, type of dye, and type of metal must be assumed to have its own dye adsorption characteristics. Thus in transferring the method to other environments with other metals some screening tests should be run in order to select conditions which do not cause destruction of the dye or the washing away of the coating of metal oxide. Also to use the present method in measuring the amount of corrosion occurring in any system, it is necessary to know the total surface area of the metal being corroded. This type of information is not available in determining the rates of corrosion in existing equipment such as heat exchangers, refinery pipes, etc., and the method cannot be used for such systems. On the other hand, where corrosion is measured by the use of probes or coupons it is not necessary to determine the surface areas since weight loss is the criterion. Lastly, exactly the same amount of dye will not always be adsorbed by a given weight of corrosion products, because the dye adsorption capacity of these products will be a function of the physical state of the corroded products. Accordingly, exact correlation of all combinations of corrosive atmospheres, metal surfaces and dye types has not been attempted herein. However, by using the types of systems disclosed herein, a fairly rapid and accurate determination of the corrosion rate can be made.

Although the invention has been demonstrated by use of a brine solution as the corrosive atmosphere, it is not to be limited thereto and other types of liquid corrosive atmospheres which will retain dyes of the types disclosed herein, or related dyes, may be tested by this method. The corrosive atmosphere may be concentrated or dilute solutions of organic and inorganic salts, acids, bases, or gases including solutions of phenol, sulphuric acid, the halogen gases, the halo-acids, nitric acid, sulfur dioxide, water and oxygen, steam and air, phenol and hydrocarbons, alkali solutions used to treat hydrocarbon mixtures, fluorophosphoric acid solutions, fertilizer solutions and any other corrosive atmosphere of these general types.

Any metal material of construction which is subject to corrosion may be tested in accordance with this invention, and it is particularly applicable to ferrous-containing metal composition and alloys. Thus included are such materials of construction as steel, iron, cast iron, ingot iron, wrought iron, ferro-aluminum, magnet steel, stainless steel and Carpenter's stainless steels.

The tests conducted in accordance with this invention are not to be limited to room temperatures. In this regard, the only limitation attaching is the decomposition temperature of the dye being used or its possible destruction in the corrosive solution due to excessive temperatures. In general, the lower limit of the temperature at which corrosion rates can be determined will be the freezing point of the corrosive liquid or solution and the upper limit will be the decomposition temperature of the particular dye used.

In carrying out the steps of the invention it is merely necessary to expose a metal sample of known weight or surface area to a corrosive liquid medium containing the dye. The color intensity of the corrosive liquid medium is first recorded before the sample is immersed therein and the changes in color intensity with time are recorded. The time element is not critical to the accuracy of the results as long as the corroding reaction has at least approached its maximum rate. There is no necessity for conducting the experiments for extended periods of time since in most instances the corrosive atmospheres under consideration exert an immediate influence on the metal surface and the reaction is continuous. Preferably the system comprising the metal specimen and the corrosive liquid medium is maintained quiescent during the tests although some circulation due to natural convection or by mild agitation appears to be desirable. Conditions of agitation which lead to removal of the corrosive product coating on the metal surface need not be avoided in those situations where the corrosive environment is confined to a single vessel since the adsorption of the dye takes place whether or not the coating is adhering to the metal surface. However, agitation which tends to remove the coating from the environment should be avoided.

One advantage of the process is that small samples of both the metal test specimen and corrosive liquid may be used. Thus even the elongated glass specimen-holders used in colorimeter work can be used to carry out the process.

Although a liquid corrosive medium has been specified herein, the invention is not to be limited thereto because the method can be carried out in a semi-continuous manner using a gaseous or vaporous corrosive atmosphere. In this instance the specimen is contacted with the vapors of corrosive atmosphere intermittently and immersed in a dye solution between each contact. In this manner the decrease in dye concentration can be followed with repeatability of results approaching the preferred technique.

The invention has been described in relation to several specific examples but it is not too limited thereto and various modifications will become apparent to one skilled in the art. The only limitations attaching to the invention appear in the appended claims.

What is claimed is:

1. The method of determining the rate of corrosion of a metallic test specimen in contact with a corrosive atmosphere which comprises maintaining a body of colored dye capable of absorption by corrosion products of the test specimen, but not capable of substantial absorption by said test specimen when uncorroded, in contact with said test specimen and determining the change in dye concentration with the passage of time.

2. The method in accordance with claim 1 in which said dye is selected from the group consisting of methylene blue, Bismarck brown, crystal violet, Congo red, Saframine O and methyl violet.

3. The method in accordance with claim 2 in which said dye is methylene blue.

4. The method in accordance with claim 2 in which said dye is methyl violet.

5. The method in accordance with claim 1 in which said test specimen is a ferrous material of construction.

6. The method of determining the rate of corrosion of a ferrous metal test specimen in contact with a corrosive liquid atmosphere which comprises adding to said corrosive liquid atmosphere a dye capable of absorption by corrosion products of the test specimen, but not capable of substantial absorption by said test specimen when uncorroded, bringing said test specimen in contact with said corrosive liquid atmosphere-dye mixture under ambient conditions conducive to corrosion of said test specimen and determining the change in concentration of said dye colorimetrically with the passage of time.

7. The method in accordance with claim 6 in which the weight of said test specimen is known, the weight loss of said test specimen is determined from time to time as said corrosion continues and a correlation is established between the rate of change of dye concentration and the rate of weight loss of said sample.

8. The method in accordance with claim 6 in which said dye is selected from the group consisting of methylene blue, Bismarck brown, crystal violet, Congo red, Saframine O and methyl violet.

9. The method in accordance with claim 6 in which said dye is methylene blue.

10. The method in accordance with claim 6 in which said dye is methyl violet.

References Cited in the file of this patent

Forrest et al.: Ind. and Eng. Chem., November 1930, pp. 1197–1199.

Huff: "Anal. Chem.," vol. 12, 1940, pp. 277–279.

Champion: "Corrosion Testing Procedures," 1952, pp. 287, 285.